United States Patent [19]
Lamphron et al.

[11] Patent Number: 5,576,790
[45] Date of Patent: Nov. 19, 1996

[54] ANTI-BACKUP MECHANISM FOR PREVENTING REVERSE ROTATION OF FILM WINDER IN CAMERA

[75] Inventors: Mark A. Lamphron; Alan G. Codd, Jr., both of Rochester, N.Y.

[73] Assignee: Eastman Kodak Company, Rochester, N.Y.

[21] Appl. No.: 594,880

[22] Filed: Feb. 7, 1996

[51] Int. Cl.$^6$ ............................................. G03B 1/00
[52] U.S. Cl. .................................. 396/396; 396/389
[58] Field of Search .................... 354/212, 213, 354/214, 206; 242/350

[56] References Cited

U.S. PATENT DOCUMENTS

| | | | |
|---|---|---|---|
| 1,133,128 | 3/1915 | Goddard | 242/71.3 |
| 2,132,157 | 10/1938 | Goldhammer | 354/212 |
| 2,220,599 | 11/1940 | Galter | 242/350 |
| 4,009,478 | 2/1977 | Yamashita | 354/213 |
| 4,174,899 | 11/1979 | Tanaka | 354/213 |

*Primary Examiner*—A. A. Mathews
*Attorney, Agent, or Firm*—Roger A. Fields

[57] ABSTRACT

A camera comprises manually rotatable film winding means, and a uni-directional clutch coupled to the film winding means to permit film winding rotation of the film winding means and to prevent reverse rotation of the film winding means. The film winding means includes a rotatable winder wheel having a toothed periphery. The uni-directional clutch includes a rotatable idler wheel having a toothed periphery engaging the toothed periphery of the winding wheel and provided with less teeth than the toothed periphery of the winding wheel, and a coil spring coiled tightly about a shank of the idler wheel and having an end portion secured with respect to the shank. The coil spring tightens on the shank to prevent the idler wheel and the winding wheel from being engagingly rotated when reverse rotation of the film winding means is attempted and relaxes on the shank to permit the idler wheel and the winding wheel to be engagingly rotated when film winding rotation of the film winding means is initiated.

3 Claims, 3 Drawing Sheets

ANTI-BACKUP MECHANISM FOR PREVENTING REVERSE ROTATION OF FILM WINDER IN CAMERA

FIELD OF THE INVENTION

The invention relates generally to the field of photography, and in particular to cameras. More specifically, the invention relates to an anti-backup mechanism or uni-directional clutch for preventing reverse rotation of a film winder in a one-time-use or other relatively simple camera.

BACKGROUND OF THE INVENTION

Film and cameras that are all in one, commonly referred to as single-use or one-time-use cameras, have recently become well known. Typically, the one-time-use camera is a simple point-and-shoot type comprising a main body part which supports a fixed-focus taking lens, a film metering mechanism including a rotatable metering sprocket and a pivotable metering lever, a manually rotatable film winder thumbwheel, a pivotable single-blade shutter, a manually depressible shutter release button, a rotatable frame counter for indicating the number of exposures remaining for picture-taking, a direct see-through viewfinder, and a conventional 35 mm film cartridge. A pair of front and rear cover parts house the main body part between them to complete the camera assembly. The rear cover part connects to the main body part and/or to the front cover part to make the main body part light-tight. A decorative cardboard outer box contains the camera assembly and has respective openings for the taking lens, the shutter release button, the film advance thumbwheel, the viewfinder, and the frame counter.

To operate the one-time-use camera, the photographer manually rotates the thumbwheel in engagement with the protruding end of a spool inside the cartridge, to rotate the spool in order to wind an exposed frame of a filmstrip into the cartridge. The winding movement of the filmstrip the equivalent of slightly more than one frame width rotates the metering sprocket in engagement with the filmstrip, to decrement the frame counter to its next lower-numbered setting, and to pivot the metering lever into engagement with the thumbwheel to prevent further winding rotation of the thumbwheel. Then, manually depressing the shutter release button to take a picture unlatches a spring-driven high energy lever which pivots the shutter blade to momentarily uncover the taking lens, and pivots the metering lever out of engagement with the thumbwheel to again permit manual rotation of the thumbwheel to wind an exposed frame of the filmstrip into the cartridge. When the maximum number of exposures available on the filmstrip are exposed and the filmstrip is completely rewound into the cartridge, the one-time-use camera is given to a photofinisher who tears the outer box off the camera unit, separates the rear cover part from the main body part, and removes the cartridge with the filmstrip from the main body part. Then, he removes the filmstrip from the cartridge to develop the negatives and make prints for the customer, and he forwards the used camera parts to the manufacturer for recycling, i.e. remanufacture.

It is desirable to make operation of the one-time-use camera relatively quiet. In this connection, it is customary for an anti-backup pawl to be spring-pivoted into continuous engagement with a toothed periphery of the thumbwheel to prevent the thumbwheel from being manually rotated in a direction opposite to the direction of winding rotation. However, engagement of the pawl with the toothed periphery produces a periodic ratcheting sound when the thumbwheel is windingly rotated. This noise presents a problem.

In traditional (re-usable) cameras, such as shown in prior art U.S. Pat. No. 1,133,128, issued Mar. 23, 1915, and No. 2,220,599, issued Nov. 5, 1940, it is suggested that a helical coil spring be coaxially disposed about the shaft of a manually rotatable film winding knob or handle, to be used as a uni-direction clutch to permit winding rotation of the knob or handle and to prevent reverse rotation of the knob or handle. Generally speaking, the coil spring is quieter than the anti-backup pawl. However, the coil spring as disposed does not provide a relatively strong counter-rotation force as compared to the anti-backup pawl.

SUMMARY OF THE INVENTION

A camera comprising manually rotatable film winding means, and a uni-directional clutch coupled to the film winding means to permit film winding rotation of the film winding means and to prevent reverse rotation of the film winding means, is characterized in that:

the film winding means includes a rotatable winder wheel having a toothed periphery; and the uni-directional clutch includes a rotatable idler wheel having a toothed periphery engaging the toothed periphery of the winding wheel and provided with less teeth than the toothed periphery of the winding wheel, and a coil spring coiled tightly about a shank of the idler wheel and having an end portion secured with respect to the shank, whereby the coil spring will tighten on the shank to prevent the idler wheel and the winding wheel from being engagingly rotated when reverse rotation of the film winding means is attempted and will relax on the shank to permit the idler wheel and the winding wheel to be engagingly rotated when film winding rotation of the film winding means is initiated.

In this instance, the coil spring provides a relatively strong counter-rotation force as compared to the coil spring in prior art U.S. Pat. No. 1,133,128 and No. 2,220,599. Preferably the toothed periphery of the winder wheel is provided with at least three times as many teeth as the toothed periphery of the idler wheel to provide at least a 3:1 gear ratio.

DETAILED DESCRIPTION OF THE INVENTION

The invention is disclosed as being embodied preferably in a one-time-use camera. Because the features of a one-time-use camera are generally, the description which follows is directed in particular only to those elements forming part of or cooperating directly with the disclosed embodiment. It is to be understood, however, that other elements may take various forms known to a person of ordinary skill in the art.

Figure 1:
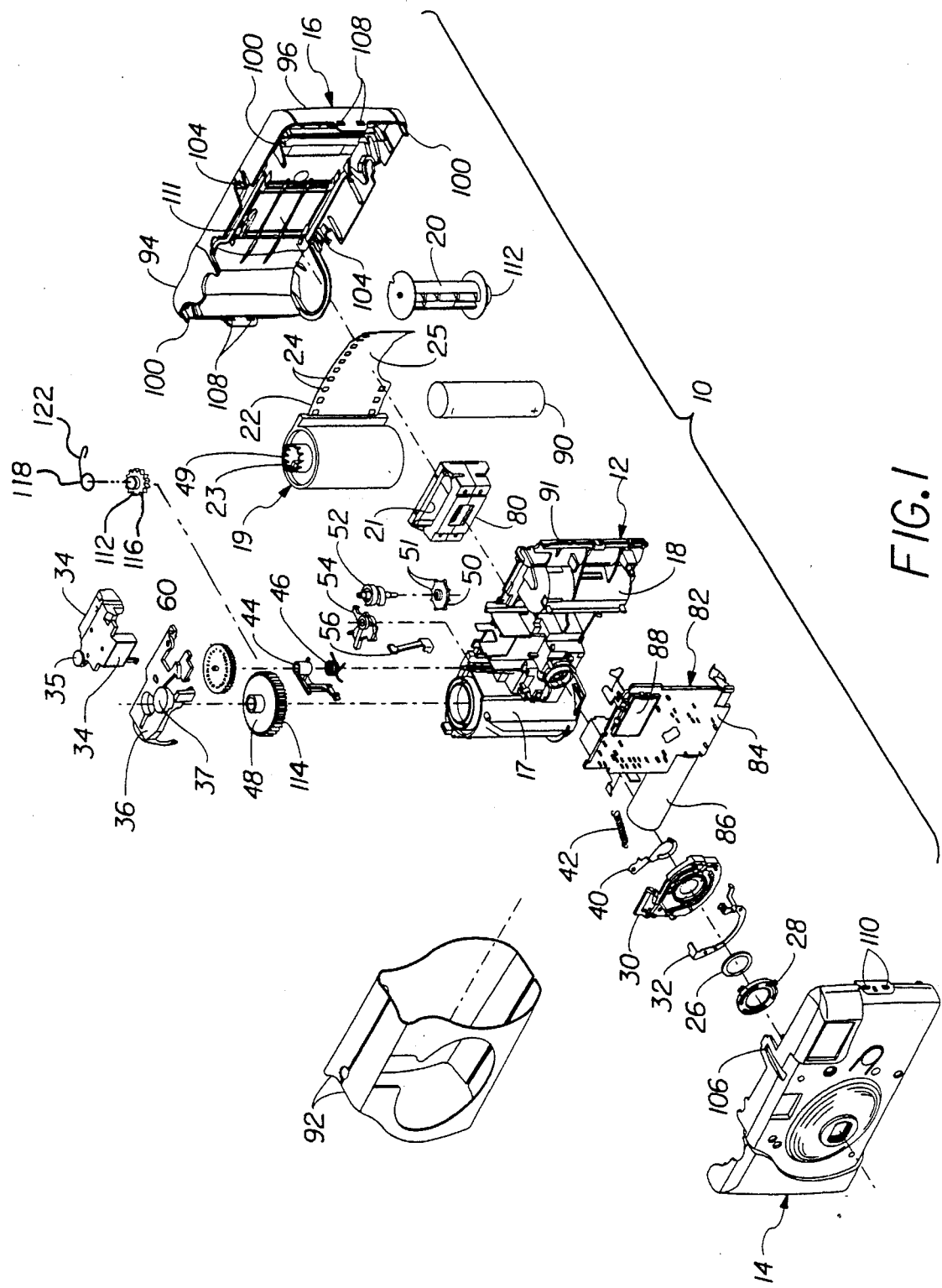
FIG. 1 is an exploded perspective view of a one-time-use camera including an anti-backup mechanism for preventing reverse rotation of a film winder in the camera, according to a preferred embodiment of the invention.

Referring now to the drawings, FIG. 1 depicts a one-time-use or single-use camera 10 having a plastic main body part 12, and a pair of plastic front and rear cover parts 14 and 16 which connect to one another to house the main body part between them in order to complete the camera assembly. The main body part 12 is adapted to be nested in the front cover part 14, and the rear cover part 16 is intended to be fitted to the main body part 12 to make the main body part light-tight.

As shown in FIG. 1, the main body part 12 has integral cartridge-receiving and film roll chambers 17 and 18 for a conventional 35 mm film cartridge 19 and a film supply spool 20. The chambers 17 and 18 are located at opposite sides of a backframe or film exposure opening 21, at which successive frames of a filmstrip 22 are exposed during picture-taking. The filmstrip 22 comes stored in a roll form on a cartridge spool 23 rotatably supported inside the film cartridge 19, and has a longitudinal series of edge perforations 24 included along a film leader 25 which protrudes from the film cartridge. However, the filmstrip 22 beginning with the film leader 25 is substantially pre-wound onto the supply spool 20 to permit successive exposed frames to be returned to the film cartridge 19 after each film exposure.

The main body part 12 supports various known camera elements which are attached to the main body part before it is nested in the front cover part 14 and the front and rear cover parts 14 and 16 are connected to one another to house the main body part between them. These camera elements are a fixed-focus taking lens 26 which is sandwiched between a snap-on lens retainer 28 and a lens support plate 30, connected to the main body part at its front; a shutter-flash synchronization switch contact 32 attached to the lens support plate 30; a pair of front and rear viewfinder lenses 34 (only the front viewfinder lens is clearly shown in FIG. 1) and an integral frame magnifier 35, connected to the main body part at its top; a shutter mechanism comprising a keeper plate 36 having an integral manually depressible shutter release button 37, a pivotable shutter blade 40, a shutter return spring 42, a pivotable high-energy lever 44 for actuating the shutter blade to pivot the blade open in order to uncover the taking lens to make a film exposure, and a lever actuating spring 46; a film advancing and metering mechanism comprising a manually rotatable thumbwheel or peripherally toothed winder wheel 48 for engaging an exposed end 49 of the cartridge spool 23 to rotate the spool in order to wind an exposed frame of the filmstrip 22 into the film cartridge 19 after each film exposure, a rotatable film metering sprocket 50 having an annular array of peripheral teeth 51 for successively engaging the respective perforations 24 in the filmstrip, and a cooperating rotatable metering cam 52, pivotable metering lever 54 and metering spring 56 which operate in a known manner with a rotatable frame counter 60 (made readable via the frame magnifier 37), the winder wheel 48, and the metering sprocket 50 to decrement the frame counter to its next lower-numbered setting and to lock the winder wheel (until the shutter release button 37 is depressed) after the winder wheel is rotated to wind an exposed frame into the film cartridge 19; a light baffle 80 which forms the backframe opening 21; and an electronic flash illumination assembly 82 comprising a circuit board 84, a capacitor 86, a flash emission lens 88, and a flash battery 90. The battery is held in a battery-receiving chamber 91 in the main body part 12. A pair of front and rear decorative labels 92 cover central portions of the front and rear cover parts 14 and 16 after the front and rear cover parts are connected to one another to house the main body part 12 between them.

As shown in FIG. 1, a breakaway cartridge-cover door 94 and a breakaway battery-cover door 96 are provided on the rear cover part 16, opposite the cartridge-receiving chamber 17 and the battery-receiving chamber 91. The two cover doors 94 and 96 can be pivoted open along respective hinge grooves along the inside of the rear cover part 16 to remove the film cartridge 19 and the battery 90 from the chambers 17 and 91.

The rear cover part 16 has three identical corner pins 100 intended to be easily received only slightly in respective corner pin-holes (not shown) in the front cover part 14 when the main body part 12 is nested in the front cover part and the front and rear cover parts are relatively arranged in an intermediate partially-separated assembly position. At the same time an identical pair of top and bottom center hooks 104 on the rear cover part 16 are locally forced into respective top and bottom center slots 106 (only the top one is shown in FIG. 1) in the front cover part 14 to prevent the front and rear cover parts from becoming further separated. Since the three corner pins 100 in the rear cover part 16 cannot be inserted further into the three corner pin-holes in the front cover part 14 without some force, and the top and bottom center hooks 104 in the rear cover part are engaged with the front cover part at its two center slots 106, a center portion of the rear cover part will be slightly bowed or flexed inwardly toward the metering sprocket 50 and there is some separation between the rear cover part and the main body part 12.

The cartridge-cover door 94 and the battery-cover door 96 each have an identical pair of end holes 108 adapted to mate with respective pairs of hooks 110 (only one pair is shown in FIG. 1) at opposite ends of the front cover part 16 to connect the front and rear cover parts 14 and 16 to one another when the main body part 12 is nested in the front cover part and the front and rear cover parts are relatively arranged in a final non-separated assembly position. At the same time the three corner pins 100 in the rear cover part 16 are machine press-forced further into the three corner pin-holes in the front cover part 14 to discontinue the inward bowing of the center portion of the rear cover part, allowing the rear cover part to inherently straighten. Thus, the rear cover part 16 is fitted to the main body part 12 to make the main body part light-tight.

Figure 2:
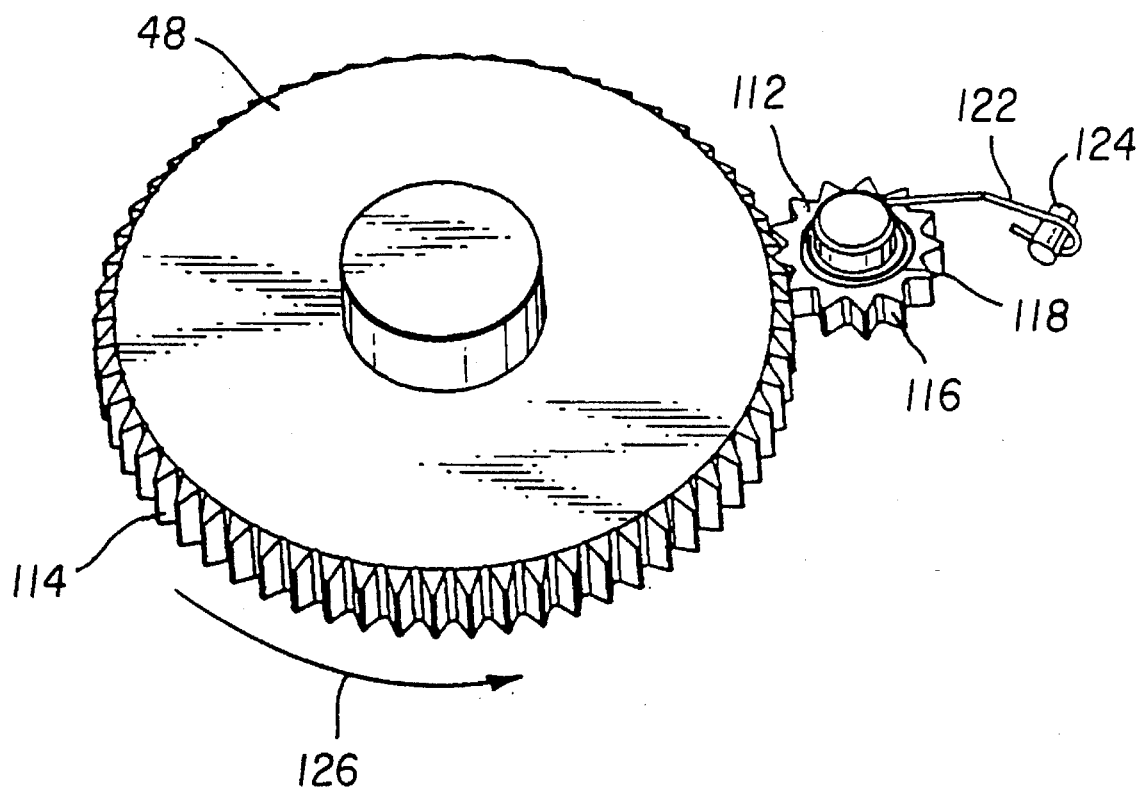
FIG. 2 is a perspective view of the film winder and the anti-back-up mechanism.

According to the invention, the toothed periphery of the winder wheel 48 engages a similar-pitch toothed periphery of a rotatable idler wheel 112 as shown in FIG. 2. The winder wheel 48 has at least three times as many peripheral teeth 114 as compared to the number of peripheral teeth 116 on the idler wheel 112, to provide at least a 3:1 gear ratio. A helical coil spring 118 is coiled tightly about a shank 120 of the idler wheel 112, and it has an end portion 122 that is anchored to a fixed pin 124 to secure the end portion with respect to the shank. See FIGS. 2 and 3. Preferably, the coil spring 118 has a diameter that is slightly less than the diameter of the shank 120, to obtain a compression fit of the coil spring on the shank.

Figure 3:
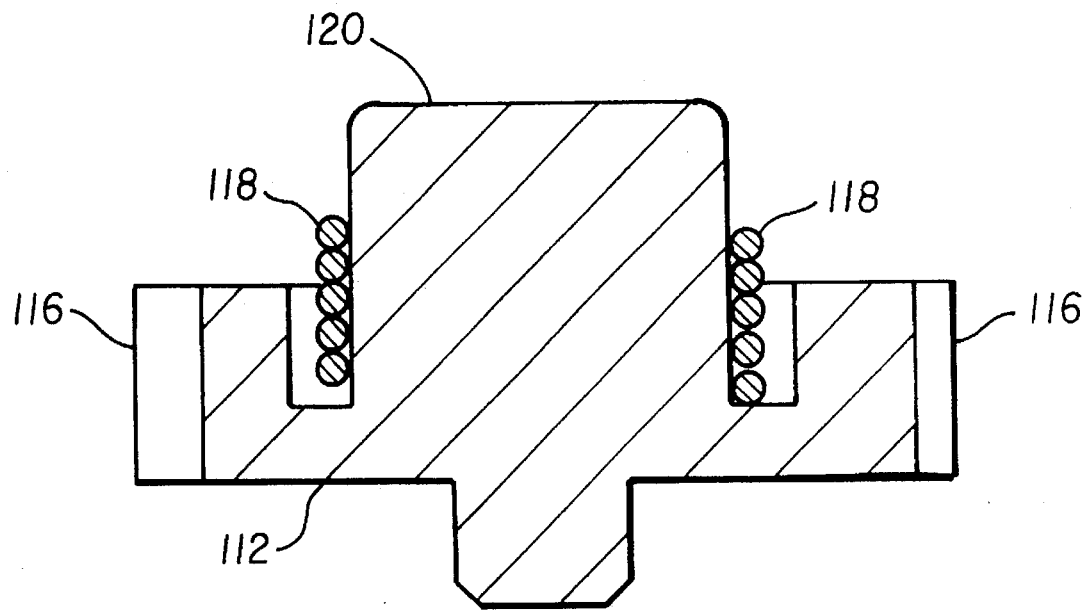
FIG. 3 is a sectional view of the anti-backup mechanism in a rotation-permitting condition.

When the winder wheel 48 is manually rotated in a film winding direction 126 (in engagement with the exposed end 49 of the cartridge spool 23 to rotate the spool in order to wind an exposed frame of the filmstrip 22 into the film cartridge 19), as indicated in FIG. 2, the idler wheel 112 is oppositely rotated in an uncoiling direction of the coil spring 118. Thus, as shown in FIG. 3, the coils of the coil spring 118 briefly turn with the shank 120 to loosen or relax on the shank.

Figure 4:
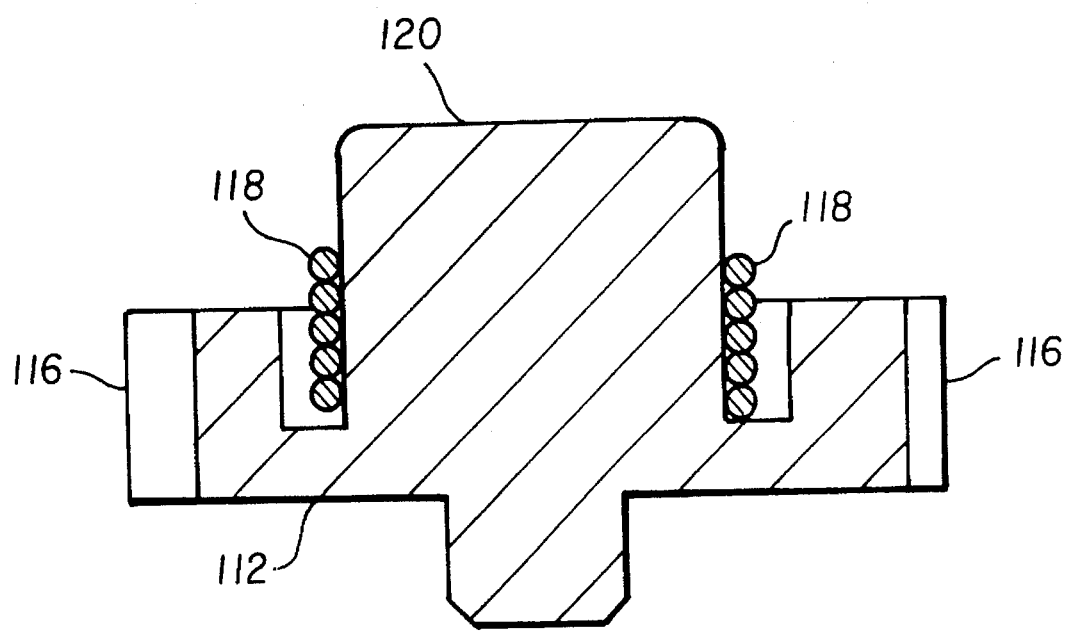
FIG. 4 is a sectional view of the anti-backup mechanism in a rotation-preventing condition

Conversely, when reverse rotation (opposite to the film winding direction 126) of the winder wheel 48 is initiated, the idler wheel 112 is oppositely rotated in a coiling direction of the coil spring 118. Thus, as shown in FIG. 4, the coils of the coil spring 118 turn with the shank 120 to tighten or constrict on the shank to thereby brake the shank. The coil spring 118 then, owing to at least a 3:1 gear ratio between the winder wheel 48 and the idler wheel 112, provides a relatively strong counter-rotation or anti-backup force which prevents reverse rotation of the winder wheel.

As viewed in FIG. 2, the winder wheel 48 is rotatable 360 degrees in the film winding direction 126. The toothed periphery of the idler wheel 112 engages the toothed periphery of the winder wheel 48 at a location that is within the forth quadrant (271 degrees–359 degrees) of unwinding rotation of the winder wheel.

The invention has been described with reference to a preferred embodiment. However, it will be appreciated that variations and modifications can be effected by a person of ordinary skill in the art without departing from the scope of the invention.

PARTS LIST 10 one-time-use camera
12 main body part
14 front cover part
16 rear cover part
17 cartridge-receiving chamber
18 film roll chamber
19 film cartridge
20 film take-up spool
21 backframe opening
22 filmstrip
23 cartridge spool
24 edge perforations
25 film leader
26 taking lens
28 lens retainer
30 lens support plate
32 shutter-flash synchronization switch contact
34 front and rear viewfinder lenses
35 frame magnifier
36 keeper plate
37 shutter release button
40 shutter blade
42 shutter return spring
44 high-energy lever
46 lever actuating spring
48 winder wheel
49 exposed end of spool 23
50 film metering sprocket
51 peripheral teeth
52 metering cam
54 metering lever
56 metering spring
60 frame counter
80 light baffle
82 electronic flash illumination assembly
84 circuit board
86 capacitor
88 flash emission lens
90 battery
91 battery-receiving chamber
92 front and rear labels
94 cartridge-cover door
96 battery-cover door
100 three corner guide pins
104 top and bottom center hooks
106 top and bottom center slots
108 two pairs of end holes
110 two pairs of end hooks
112 idler wheel
114 peripheral teeth of winder wheel
116 peripheral teeth of idler wheel
118 coil spring
120 shank
122 spring end portion
124 pin
126 winding direction

We claim:

1. A camera comprising manually rotatable film winding means, and a uni-directional clutch coupled to said film winding means to permit film winding rotation of the film winding means and to prevent reverse rotation of the film winding means, is characterized in that:

said film winding means includes a rotatable winder wheel having a toothed periphery; and said uni-directional clutch includes a rotatable idler wheel having a toothed periphery engaging said toothed periphery of said winder wheel and provided with less teeth than the toothed periphery of the winder wheel, and a coil spring coiled tightly about a shank of said idler wheel and having an end portion secured with respect to said shank, whereby said coil spring will tighten on said shank to prevent said idler wheel and said winder wheel from being engagingly rotated when reverse rotation of said film winding means is attempted and will relax on the shank to permit the idler wheel and the winder wheel to be engagingly rotated when film winding rotation of the film winding means is initiated.

2. A camera as recited in claim 1, wherein said toothed periphery of said winder wheel is provided with at least three times as many teeth as said toothed periphery of said idler wheel to provide at least a 3:1 gear ratio.

3. A camera as recited in claim 1, wherein said winder wheel is rotatable 360 degrees in a film winding direction, and said toothed periphery of said idler wheel engages said toothed periphery of said winder wheel at a location that is greater than 270 degrees and less than 359 degrees in the film winding direction.

* * * * *